(12) United States Patent
Wijk et al.

(10) Patent No.: US 8,366,859 B2
(45) Date of Patent: Feb. 5, 2013

(54) METHOD AND DEVICE FOR SEALING

(75) Inventors: Magnus Wijk, Lund (SE); Magnus Rabe, Akarp (SE); Gert Holmström, Lund (SE); Mats Qvarford, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 12/982,345

(22) Filed: Dec. 30, 2010

(65) Prior Publication Data

US 2011/0094672 A1    Apr. 28, 2011

Related U.S. Application Data

(62) Division of application No. 11/792,070, filed as application No. PCT/SE2005/001911 on Dec. 13, 2005, now abandoned.

(30) Foreign Application Priority Data

Dec. 14, 2004    (SE) ...................................... 0403038

(51) Int. Cl.
*B32B 37/26*    (2006.01)
(52) U.S. Cl. .................................................. 156/272.4
(58) Field of Classification Search ............... 156/272.2, 156/272.4
See application file for complete search history.

(56) References Cited

U.S. PATENT DOCUMENTS

| | | | |
|---|---|---|---|
| 3,709,775 A | 1/1973 | James | |
| 3,730,804 A | 5/1973 | Dickey | |
| 3,879,247 A * | 4/1975 | Dickey | ........................ 156/272.4 |
| 4,602,139 A * | 7/1986 | Hutton et al. | .................. 219/603 |
| 4,704,509 A | 11/1987 | Hilmersson et al. | |
| 5,248,864 A | 9/1993 | Kodokian | |
| 5,260,535 A | 11/1993 | Holmstrom et al. | |
| 5,889,263 A | 3/1999 | Andersson | |
| 6,056,844 A | 5/2000 | Guiles et al. | |
| 2002/0113066 A1 * | 8/2002 | Stark et al. | ..................... 219/634 |

FOREIGN PATENT DOCUMENTS

| | | |
|---|---|---|
| EP | 0 355 423 A2 | 2/1990 |
| EP | 0 796 718 A1 | 9/1997 |
| GB | 1421780 A | 1/1976 |
| GB | 2 004 497 A | 4/1979 |
| JP | 6-509293 A | 10/1994 |
| JP | 7-009591 A | 1/1995 |
| JP | 07009591 A * | 1/1995 |
| RU | 2 179 944 C2 | 2/2002 |
| WO | WO 93/02849 A1 | 2/1993 |
| WO | WO 03/095198 A1 | 11/2003 |

OTHER PUBLICATIONS

Machine Translation of JP 07009591 A, Jan. 13, 1995.*
English-language translation of Office Action issued Mar. 16, 2010 in Japanese Patent Application No. 2007-546606.

(Continued)

*Primary Examiner* — Daniel McNally
(74) *Attorney, Agent, or Firm* — Buchanan Ingersoll & Rooney PC

(57) ABSTRACT

A method for sealing a first packaging material laminate, comprised of at least one layer of magnetizable particles and a sealable layer, to a second packaging laminate involves facing the sealable layer towards the second laminate, providing an alternating magnetic field to the laminates in a sealing zone, thereby generating magnetic hysteresis losses in the laminate having the magnetizable particles, which losses create heat substantially melting the sealable layer in the sealing zone, and applying a sealing pressure to the first and second laminate to cause the first and second laminate to be pressed together in the sealing zone, thereby sealing the laminates to each other.

11 Claims, 5 Drawing Sheets

OTHER PUBLICATIONS

English-language translation of Office Action issued Feb. 6, 2009 in Chinese Patent Application No. 200580042812.1.

Official Action issued Aug. 31, 2009 in Indonesian Patent Application No. W-00200701837, and English-language translation of Official Action.

Official Action issued Oct. 1, 2009 in Russian Patent Application No. 2007126840/12(029216), and English-language translation of Official Action.

Official Action issued Dec. 26, 2008 in Vietnamese Patent Application No. 1-2007-01413, and English-language translation of Official Action.

International Search Report (PCT/ISA/210) issued on Mar. 10, 2006, by Swedish Patent Office as the International Searching Authority for International Application No. PCT/SE2005/001911.

European Search Report dated Sep. 16, 2011 issued in the corresponding European Patent Application No. 05815742.1.

* cited by examiner

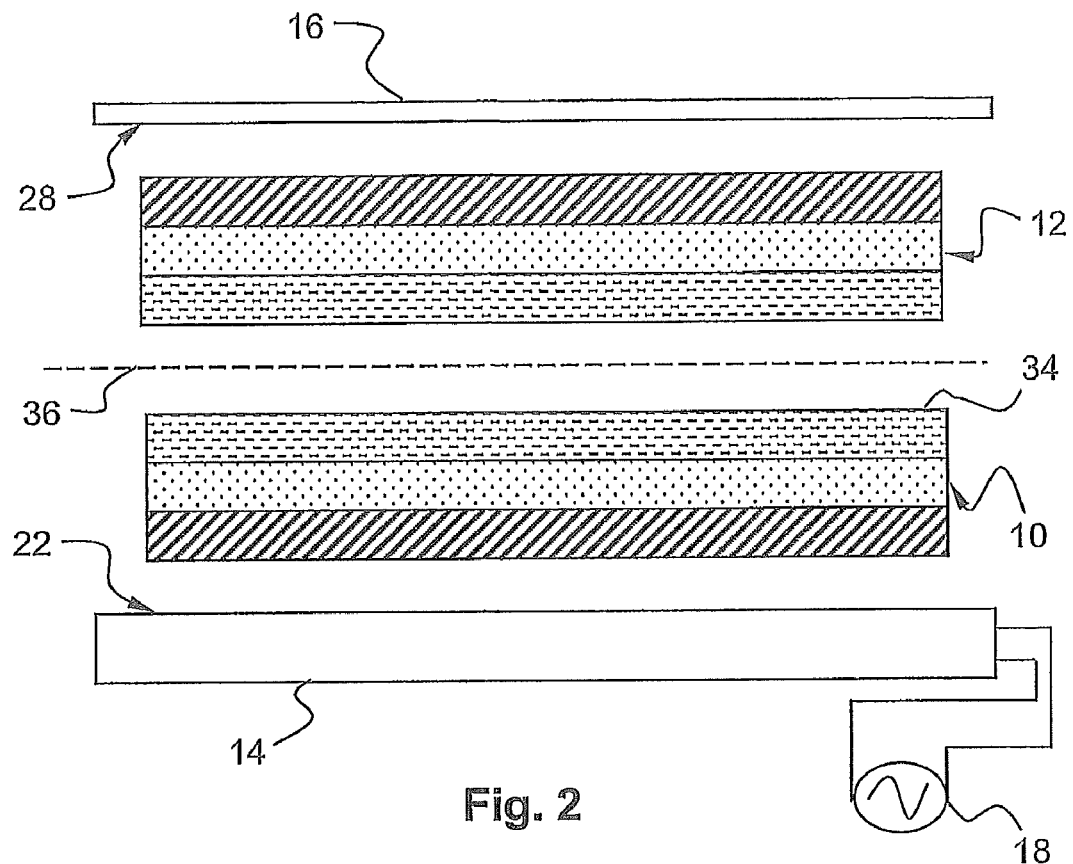
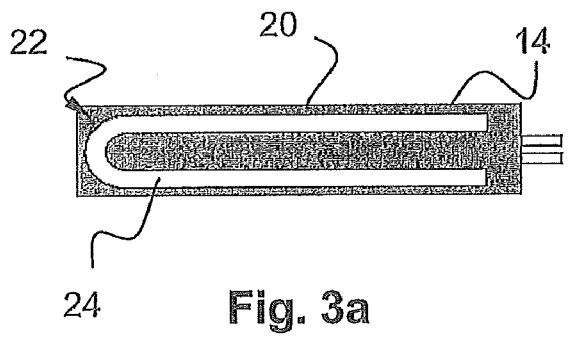
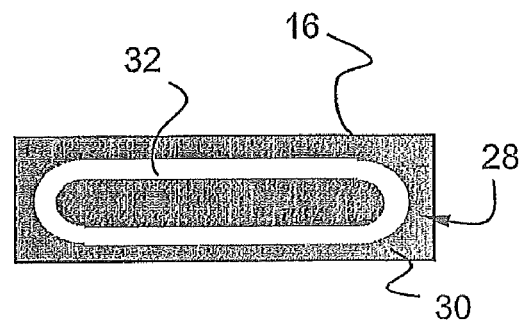

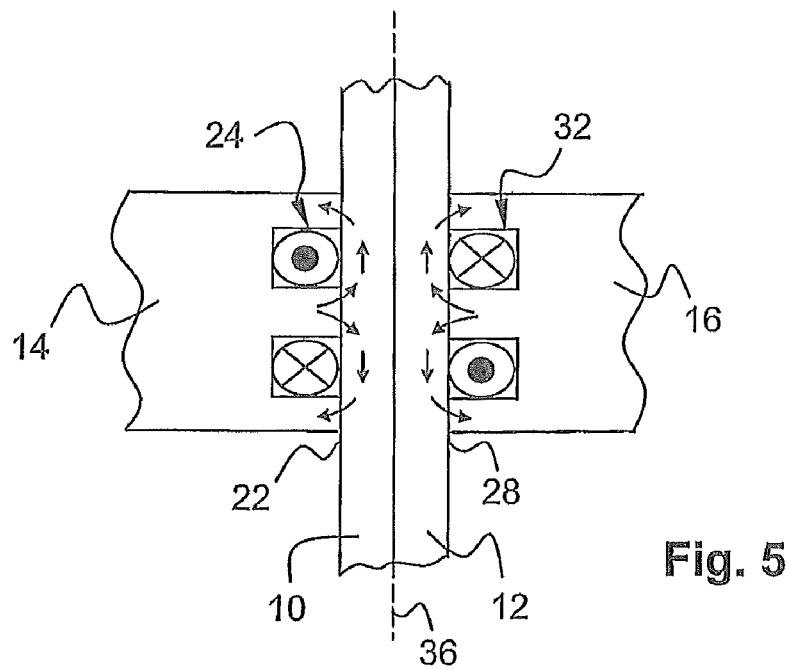
Fig. 5
Fig. 6a
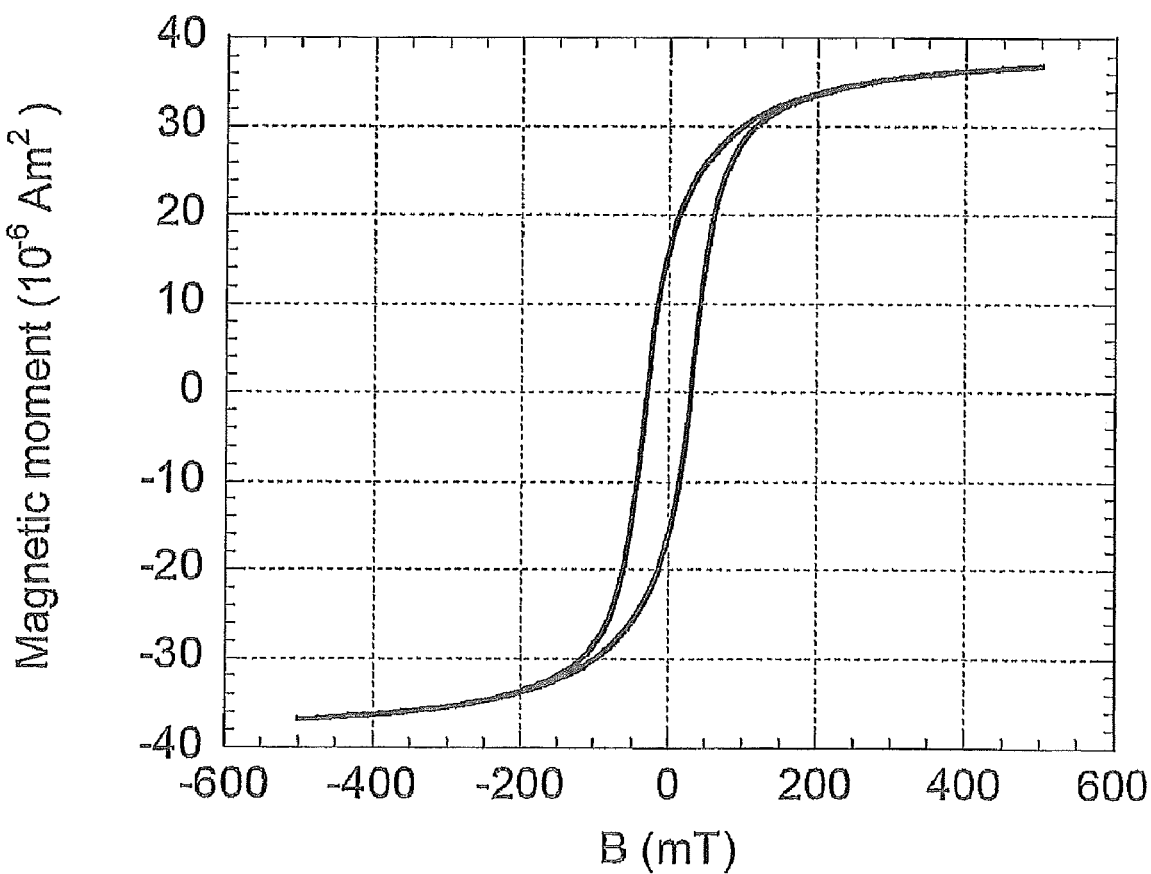

METHOD AND DEVICE FOR SEALING

This application is a divisional of U.S. application Ser. No. 11/792,070 filed on Jun. 1, 2007, which is a U.S. national stage application based on International Application No. PCT/SE2005/001911 having an international filing date of Dec. 13, 2005, and which claims priority to Swedish Application No. 0403038-3 having a filing date of Dec. 14, 2004, the disclosures of all of which are incorporated herein by reference.

FIELD OF THE INVENTION

The present invention refers to a method and a device for magnetic hysteresis sealing of a packaging material laminate comprising at least one layer comprising magnetizable particles.

BACKGROUND DISCUSSION

In the international patent publication WO 03/095198, which is hereby incorporated by reference, a packaging material laminate is described which comprises at least one layer comprising magnetizable particles. The laminate is of the type used for manufacturing of for example liquid food packages, and generally comprises a layer of paper or carton, layers of plastic and barriers, such as for example oxygen barriers. One of the outer layers is normally a sealable layer of a thermoplastic material which is used when sealing one laminate to another. Using thermoplastic layers is known in the art and will not be further described herein.

The magnetizable particles can for example be magnetite, $Fe_3O_4$ and have a mean size of about 0.5 μm. Other materials and particle sizes can of course also be used. There exist other materials, such as for example maghemite $Fe_2O_3$, as well as other particles sizes (larger and smaller). Some may give higher seal heating power. However, care should be taken when choosing particles. Some particles can not to be used in food packaging due to legislation; others involve higher costs due to their manufacturing. At present, smaller particles than 0.5 μm need an expensive chemical manufacturing process, whereas larger particles can be manufactured mechanically by sifting.

The magnetizable particles are dispersed in any of the layers of the packaging material laminate, preferably in one of the plastic layers. Alternatively, they can be applied in a printing ink or a hot melt, which in turn is applied to the packaging material in for example a sealing zone, as described in the Swedish Application Nos. 0501409-7 and No. 0501408-9.

A packaging material laminate that comprises magnetizable particles can be sealed to another packaging material laminate using heat generated by magnetic hysteresis losses. By applying an alternating magnetic field near a sealing zone of the first and second laminates the magnetic material will be magnetized according to the hysteresis loop in FIG. 1a. The vertical axis represents the magnetic moment B in the material and the horizontal axis represents the applied magnetic field H. The area enclosed by the loop represents the energy which is generated in the material due to the magnetizable particles. Since this is the energy that will be used to melt the outer sealable layers of the laminates to thereby create the seal, it is understood maximizing the hysteresis loop area will optimize the sealing process.

Generally, energy and sealing time are two parameters for controlling a sealing process. If the sealing energy is reduced, the sealing time will have to be increased, and vice versa. The same applies for magnetic hysteresis sealing. The larger the hysteresis loop area can be made, the shorter sealing time is needed (provided that the amount of particles in the laminates is the same). In a high speed packaging machine the sealing time is crucial. Then, if magnetic hysteresis sealing should be considered as a possible alternative to other sealing techniques, such as for instance induction sealing or ultrasonic sealing, the sealing time needed ought not to exceed the time required by the other techniques.

The hysteresis energy generation can be controlled in substantially two ways. One way is to increase the hysteresis loop area. It can be accomplished by increasing the applied magnetic field H until a level of magnetic saturation is reached in the particles of the laminates. The magnetic saturation level S is shown in FIG. 1b. However, increasing the magnetic field H above the saturation level S will not extend the hysteresis loop area.

Another way is to increase the frequency of the applied alternating magnetic field. Each cycle gives rise to energy generation corresponding to the hysteresis loop area, and by increasing the number of cycles per time unit the total amount of energy generated is increased. Hence, as an example, 1 Hz gives an energy contribution of one loop area per second, whereas 2 Hz will give a double energy contribution per second.

In this context it should be mentioned that authorities regulate the amount of electromagnetic radiation that can be emitted and which frequency bands are open for public use. In some frequency band intervals the use is restricted. In Europe this is presently controlled by the EMC Directive.

As mentioned above there are regulations on the amount of radiation that can be emitted. If exceeding the allowed values the device or machine needs to be shielded off from the surrounding environment. Such shielding is generally accomplished by mechanically encapsulating the device or machine in which the high frequency is used. However, it is known that emissions from high frequency devices are more difficult to shield off since they are more likely to slip out through any tiny opening in the shield. Thus, for practical and economic reasons it is preferred to use low frequencies. At present, an interval between 0.5-5 MHz is preferred. Hence, it is important to be able to optimize the hysteresis loop area not to be forced to increase the frequency.

SUMMARY

An object of the invention has been to find an efficient and practical way of using magnetic hysteresis for sealing packaging material laminates in a high speed packaging machine. Another object is to achieve a sealing technique by which overheating of the packaging material laminates is prevented. These objects have been achieved by a method comprising providing an alternating magnetic field to the laminates in a sealing zone, thereby generating magnetic hysteresis losses in the laminate comprising the magnetizable particles, which losses create heat substantially melting the sealable layer in the sealing zone, and applying a sealing pressure to the first and second laminate, which pressure causes the first and second laminate to be pressed together in the sealing zone, thereby sealing the laminates to each other.

Applying a magnetic field to packaging material laminates comprising magnetizable particles is effective and has been found to be an equally good sealing technique compared to the techniques normally used in packaging machines. Further, the use of magnetic hysteresis sealing prevents overheating of the packaging material laminates. This is due to the fact that the ferromagnetic properties of the magnetizable particles slowly start to cease when the laminates are heated. Thus, during temperature raise the hysteresis loop area will decrease. Consequently, the energy generated in the material will also decrease. Such energy decrease will in turn also decrease the heat generated in the material. Accordingly, since the heat is decreasing, the magnetization of the particles can increase again, and can increase until the heat generated in the material makes it start decreasing again. Thus, a system has been formed in which the temperature will fluctuate within a certain range, but will never raise above it.

By a suitable choice of magnetizable particles, particle amounts and packaging material laminate structures the risk of overheating is eliminated. In a presently preferred embodiment the method comprises the step of providing the alternating magnetic field in such a way that the main direction of the magnetic field lines is substantially parallel with a plane constituting the first packaging material laminate. In this way a magnetic field is generated in the sealing zone which magnetic field is sufficient to achieve a sealing time and a frequency that are industrially applicable in a high speed packaging machine. It has been found that the area of a hysteresis loop where the main direction of the magnetic field lines is substantially parallel with the laminate plane is substantially equal to the area of a hysteresis loop where the main direction of the magnetic field lines is substantially perpendicular to the laminate plane. The difference is that the magnetic field needed to obtain the area in the perpendicular case is higher, in fact almost twice as high. Thus, the parallel case would seem more efficient.

In another presently preferred embodiment the method comprises the step of generating an alternating magnetic field of a strength substantially large enough to make the magnetizable particles substantially reach the magnetic saturation level. As described above, the larger the hysteresis loop area can be made, the more energy is produced in the material. Since the area is increasing up to the magnetic saturation level of the material, it is preferable to apply a magnetic field large enough to make the material reach that level. However, above the saturation level the area will not increase, and therefore there is no value of applying a stronger magnetic field.

In yet another presently preferred embodiment the method according to the invention comprises the step of providing said alternating magnetic field by at least a sealing jaw, the sealing jaw being an inductor comprising a conductor connected to an alternating current supply. This is good from an economic point of view since the basis of conventional inductors used for induction sealing can be used.

In a further presently preferred embodiment the method comprises the step of enhancing said magnetic field by using an electrically conducting anvil. In yet a further embodiment the method comprises the step of providing said anvil opposed to the sealing jaw, the anvil being able to induce a current in response to the current in the sealing jaw, thereby generating a magnetic field enhancing the field generated by the sealing jaw. The parallelism of the magnetic field lines is increased and a stronger magnetic field can be obtained without having to increase the current supplied to the inductor of the sealing jaw.

The present invention also comprises a device which is characterized in that it comprises means for providing an alternating magnetic field to the laminates in a sealing zone, thereby generating magnetic hysteresis losses in the laminate comprising the magnetizable particles, which losses create heat substantially melting the sealable layer in the sealing zone, and means for applying a sealing pressure to the first and second laminate, which pressure causes the first and second laminate to be pressed together in the sealing zone, thereby sealing the laminates to each other.

In at least one of the presently preferred embodiments of the device said means adapted to provide the alternating magnetic field is a sealing jaw in the form of an inductor comprising a conductor connected to an alternating current supply and that the means for applying said sealing pressure is said sealing jaw and an anvil. In this way the magnetic field and the pressure is applied by the same means, and the means are substantially conventional equipment used for induction sealing. This is advantageous from an economic point of view.

In another presently preferred embodiment the anvil is electrically conducting anvil and provided to enhance said magnetic field. Said anvil is provided with a conductor adapted to induce a current in response to the current in the sealing jaw, thereby generating a magnetic field enhancing the magnetic field generated by the sealing jaw.

Additional presently preferred embodiments are described in the appended dependent device claims.

BRIEF DESCRIPTION OF THE DRAWINGS

In the following, a presently preferred embodiment of the invention will be described in greater detail, with reference to the enclosed drawings, in which:

FIG. 6a shows a hysteresis loop where the magnetic field is applied substantially parallel to the plane of the packaging material laminate.

DETAILED DESCRIPTION

Figure 1A:
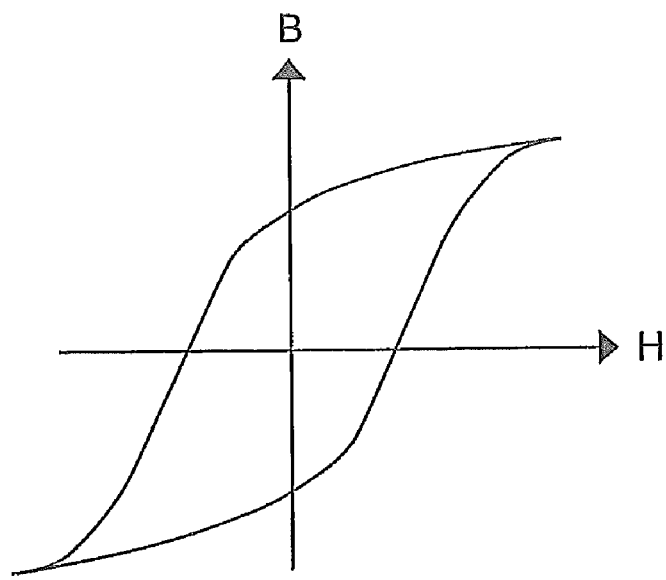
FIG. 1a schematically shows a hysteresis loop.
Figure 1B:
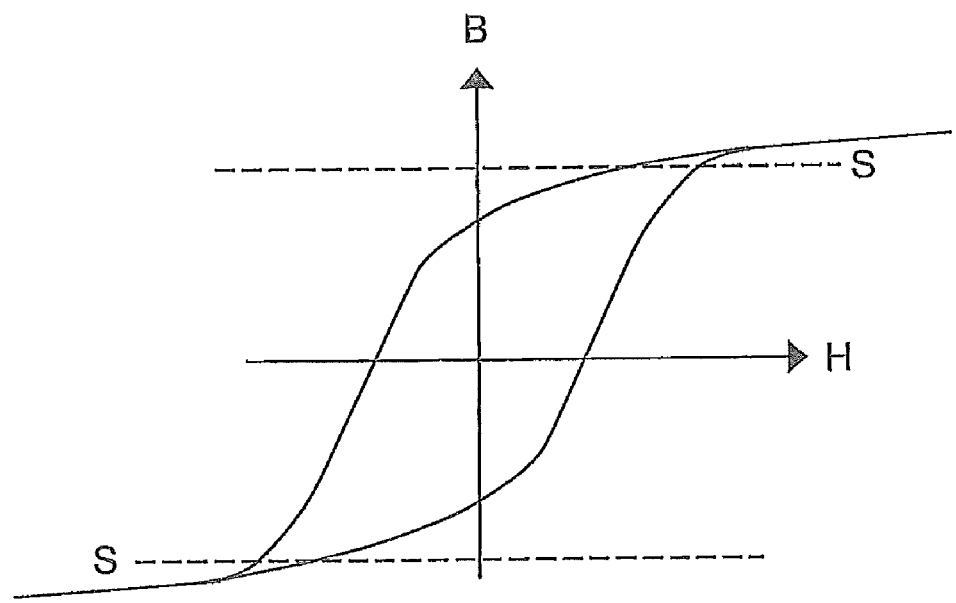
FIG. 1b schematically shows a hysteresis loop where the applied magnetic field is higher than the magnetic saturation level of the magnetizable particles, FIG. 2 schematically shows two packaging material laminates to be sealed together in a begging joint by means of a sealing jaw and an anvil, FIG. 3a schematically shows a view of the action face of the sealing jaw shown in FIG. 2, FIG. 3b schematically shows a cross section through said sealing jaw, FIG. 4 schematically shows a view of the action face of the anvil shown in FIG. 2, FIG. 5 schematically shows a cross section of the sealing jaw, the packaging material laminates, the anvil and the magnetic fields in the sealing zone.

FIG. 2 shows a presently preferred embodiment of the invention. A first and a second packaging material laminate 10, 12 to be sealed together in a joint by means of a sealing jaw 14 and an anvil 16. In the joint shown the two laminates are abutting each other with their inside surfaces facing each other. In this presently preferred embodiment the sealing jaw 14 is an inductor similar to the ones used for induction sealing (where the laminate comprises aluminum foil that generate heat). The inductor 14 is here coupled to an alternating current supply 18. The alternating current is preferably in the range of 75-300 A and the power needed from the power supply is a few kW. A preferred interval is 2-10 kW. The frequency is preferably in the MHz range, and a preferred frequency interval is 0.5-5 MHz. A most preferred interval is 1-4 MHz. The frequencies that are prohibited for common use due to authority regulations are of course, in practice, excluded from said intervals.

Figure 3B:
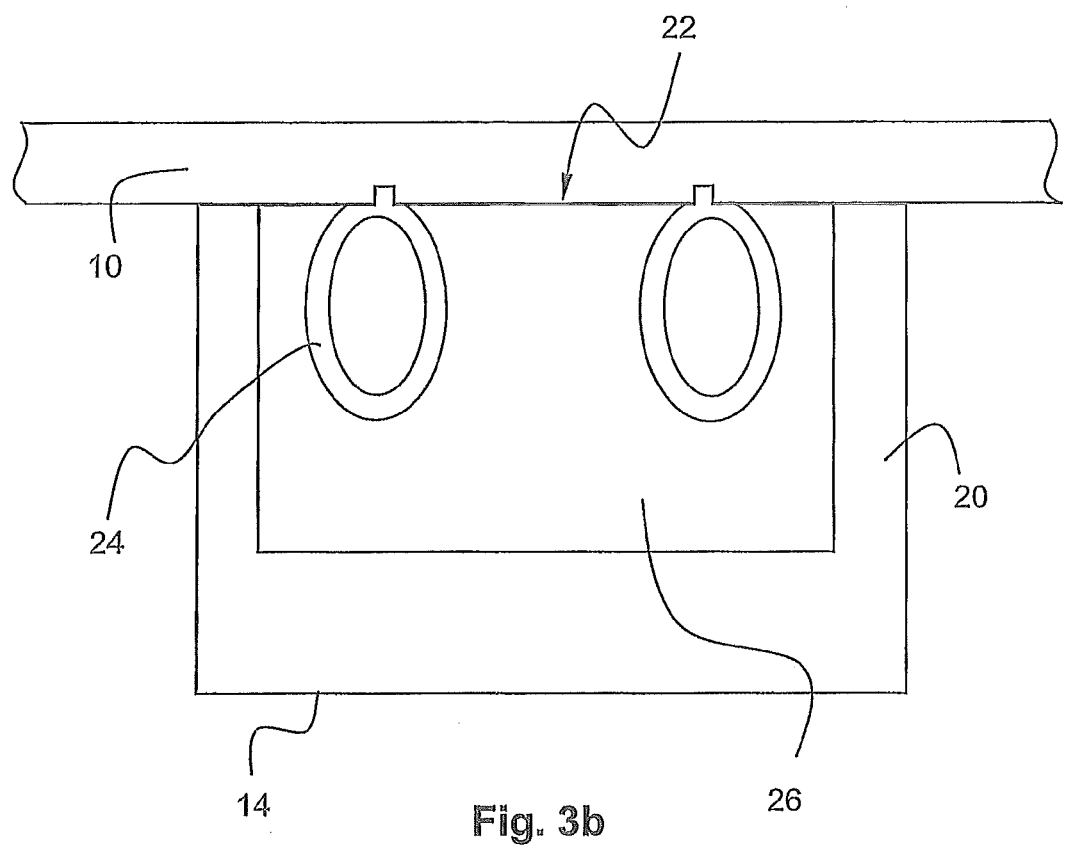

The inductor 14 comprises an insulator 20 having an action face 22 which will abut the laminate in the sealing zone during sealing, see FIG. 3a. In the action face 22 a conductor 24 is embedded, said conductor 24 being provided to be in contact with the laminate during sealing, see FIG. 3b. The conductor 24 is manufactured of an electrically conducting material, i.e. a material with low resistivity and is preferably provided with cooling channels. Preferably, the conductor 24 can be manufactured from copper. Further, the conductor 24 has the form of an open loop where each respective end is connected to the alternating current supply 18, see FIG. 3a. The entire loop is adapted to be in contact with the packaging material laminate, i.e. the plane of the loop is substantially parallel to the plane of the packaging material laminate. Further, the loop is elongated and extends along the longitudinal extension of the sealing jaw 14. The opening in the loop where the current connections are placed is positioned in one end of the elongated sealing jaw 14.

The insulator 20 on the other hand is manufactured from an insulating, non-conducting material with or without magnetic permeability characteristics. Preferably, plastic materials or ceramics can be used. To enhance the intensity of the magnetic field and to direct the field lines a magnetic permeable material can be provided in the insulator 20. One way is to provide the insulator 20 with ferrite powder. The powder can be added during moulding of the plastic or ceramic insulator. Another way is to use inserts 26 of a material with a permeability value within the following range: $\mu=10$-2500. Preferably, inserts 26 of for example Ferrotron™, or materials with values in the upper part of the range, can be provided in the insulator 20 near the conductor 24. The technique is similar to that within the induction sealing technology.

During sealing the sealing jaw 14 is cooperating with an anvil 16, see FIG. 2. In the example the anvil 14 is electrically conducting, but passive, i.e. not connected to a power supply. An embodiment of the anvil 16 will be described with reference to FIG. 2 and FIG. 4. The anvil 16 has a corresponding action face 28 adapted to be facing the action face 22 of the sealing jaw 14 during sealing, compare FIG. 3b. Further, said anvil 16 is made from an insulator 30, which insulator 30 is provided with a conductor 32. Said conductor 32 is made of an electrically conducting material, i.e. a material with low resistivity, preferably copper. It is embedded in the action face 28 of the insulator 30 in such a way that the conductor 32 is adapted to be in contact with the packaging material laminate. Alternatively, the conductor 32 can be covered by for example a layer of rubber, at least in the action face 22, to protect the packaging material laminate from direct contact with the conductor. Further, the conductor 32 has the form of a closed loop. The entire loop is adapted to be in contact with the packaging material laminate, i.e. the plane of the loop is substantially parallel to the plane of the packaging material laminate. Further, the loop is elongated and extends along the longitudinal extension of the anvil. The insulator 30 of the anvil 16 can be similar to the insulator 20 of the sealing jaw 14. It is manufactured from an insulating, non-conducting material with or without magnetic permeability characteristics. Preferably, plastic materials or ceramics can be used. A magnetic permeable material can be provided in the insulator 30. Either the insulator is provided with ferrite powder (added during moulding of the plastic or ceramic insulator), or inserts (not shown) of a material with a permeability value are used. The insert material can have a permeability value in the range of $\mu=10$-2500. Preferably, inserts of for example Ferrotron™ can be used.

The sealing jaw 16 and the anvil 14 are provided to apply a sealing pressure to the packaging material laminates pressing them together in a sealing zone. The way of applying the pressure is known in the art and will not be described further herein.

When sealing together two packaging material laminates 10, 12 a sealable layer 34 of the first laminate 10 is placed facing the other laminate 12. Then, the sealing jaw 14 and the anvil 16 press the laminates 10, 12 towards each other. An alternating current is thereafter supplied to the conductor 24 of the sealing jaw 14. The current generates a magnetic field in the sealing zone of the laminates 10, 12. The magnetic field lines will be substantially parallel to a plane 36 of the laminates 10, 12. The direction of the field lines will be further described below. Said magnetic field affects the magnetizable particles in the laminate, which has been described in the introduction, and the energy from the hysteresis losses melts the sealable layer 34. The energy from the hysteresis losses will be in the range of 5-50 Joule, probably around 10 Joule.

During operation a current is induced in the anvil 16 because of the inductor in the sealing jaw 14 on the other side of the packaging material laminates 10, 12. The current that is induced generates a magnetic field which will enhance the strength and direction of the magnetic field applied by the inductor of the sealing jaw 14.

In this embodiment the sealing pressure is applied substantially simultaneously as the magnetic field is applied. This means that the sealing pressure may be applied at the same time as the magnetic field, or slightly afterwards or slightly before. Preferably, the sealing pressure is applied before the magnetic field is applied. Alternatively, in some applications, the magnetic field and the pressure may be applied separately (by separate means) and in sequence. In a first step the magnetic field may be applied and when it has heated the laminate, the sealing pressure is applied in a second step. Different means can be used to apply the magnetic field and the sealing pressure. When the sealing zone has been sealed, i.e. the sealable layer 34 has been melted, the application of magnetic field is ceased. Preferably, the sealing pressure is maintained for a short period of time for cooling purposes. This period of time may be in the range of 100-200 ms. The cooling procedure is known from other sealing technologies.

It has been found that the dissipated energy from the hysteresis losses is directly proportional to the frequency. Further, it has been found that the relation between the frequency and the sealing time is substantially linear. Thus, the sealing time will have to be increased if the frequency is decreased. In addition, it has been found that the relation between the particle concentration and the sealing time is substantially linear. Hence, a larger amount of particles in the laminate will reduce the sealing time and vice versa.

Magnetizable particles that can be used are magnetite, $Fe_3O_4$. Trials have been made with a mean size of the particles of about 0.5 μm (particles from Höganäs, X-MP4). The results are positive. Other materials and particle sizes can of course also be used. However, care should be taken when choosing particles. Some kinds are can not to be used in food packaging due to legislation; others involve higher costs due to their manufacturing. At present, manufacturing of smaller particles than 0.5 μm need a more complicated manufacturing process. A sample has been made in which magnetic particles of the described type ($Fe_3O_4$, particle size about 0.5 μm) are comprised in a polyethylene (PE) layer in each respective laminate. The amount of the magnetic particles in the PE layer is about 17 g/m2. Using a frequency of 2 MHz and applying a magnetic field strength close to the magnetic saturation level, the sealing time for properly sealing together the two laminates 10, 12 will be approximately 100 ms. It should be understood that other amounts of the magnetic particles, as well as other sizes of the particles and other packaging material laminates will require different sealing times and/or different frequencies.

FIG. 5 schematically shows a cross section of the sealing jaw 14, the packaging material laminates 10, 12, the anvil 16 and the magnetic fields in the sealing zone. Due to the cross section the conductor 24 of the sealing jaw 14 and the conductor 32 of the anvil 16 are shown as two circles each. In the circles the momentary direction of the current is shown. The arrows represent magnetic field lines and it can be seen that the main field lines near the packaging material laminates 10, 12 are substantially parallel with the plane 36 of the packaging material laminates 10, 12. Further, it can be seen that the contribution from the anvil 16 is enhancing the magnetic field generated by the sealing jaw 14. The arrows representing the magnetic field from the anvil 16 are also substantially parallel with the plane 36 of the packaging material laminates 10, 12 and are directed in the same direction as the magnetic field lines of the sealing jaw 14.

Figure 6B:
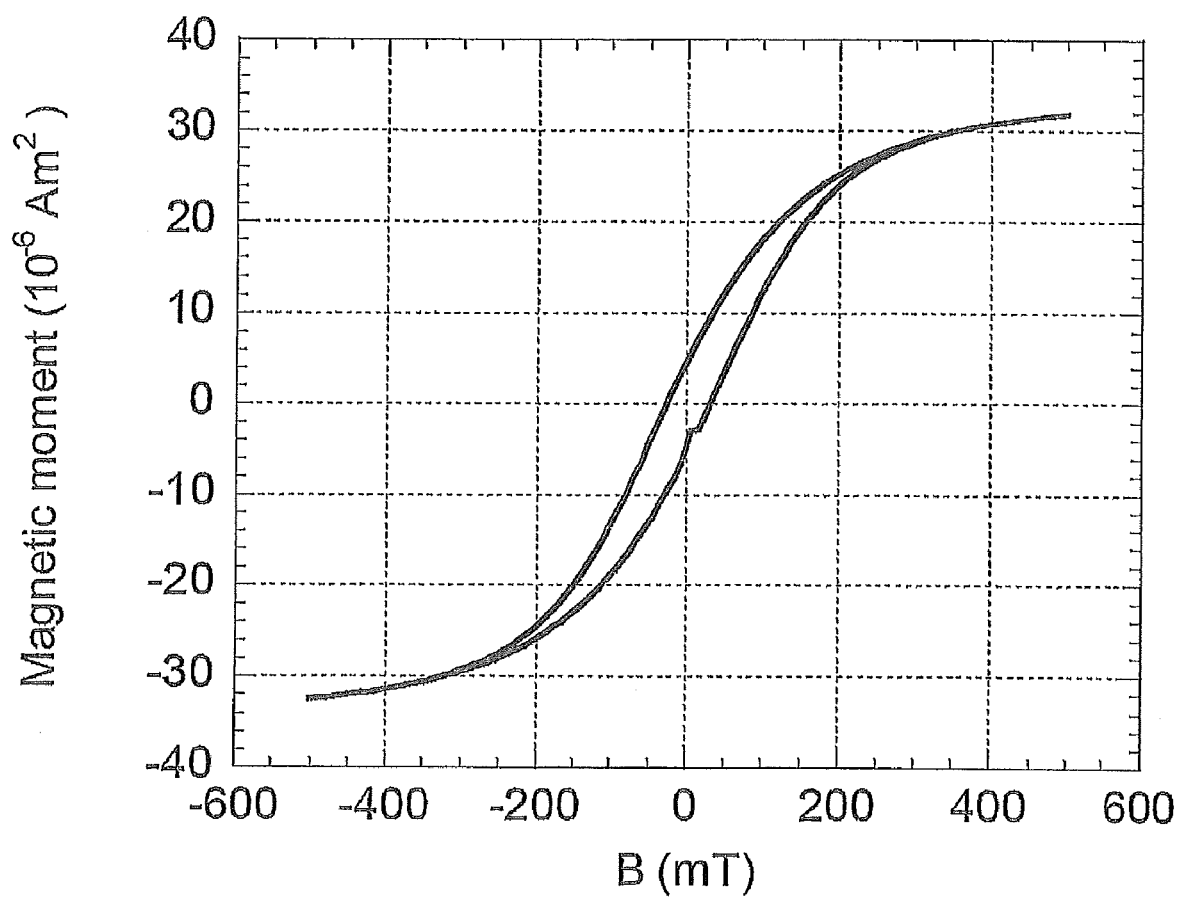
FIG. 6b shows a hysteresis loop where the magnetic field is applied substantially perpendicular to the plane of the packaging material laminate, and FIG. 7 schematically shows a blank formed as a sleeve by means of a longitudinal seal.

In FIG. 6a and FIG. 6b hysteresis loops are shown. FIG. 6a describes the case above, i.e. where the magnetic field is applied in parallel with the plane of the packaging material laminate, whereas FIG. 6b describes a case where the magnetic field is applied perpendicular to the plane of the packaging material laminate. It can be seen that the two areas are substantially similar in size, but that the magnetic field needed two obtain the area in FIG. 6b is higher, in fact almost twice as high. Thus, it can be concluded that it is more efficient to apply the magnetic field substantially parallel to the packaging material laminate.

The wording "parallel with the plane of the packaging material laminate" should include also the case where the packaging material is curved in the sealing zone. The magnetic field lines should then be directed to follow the curve, i.e. be substantially parallel to the respective tangent of the points in the curve.

The invention has now been described according to a presently preferred embodiment of the invention. However, it should be understood that the invention is not limited to this embodiment, but could be modified in any way within the scope of the enclosed claims.

Figure 7:
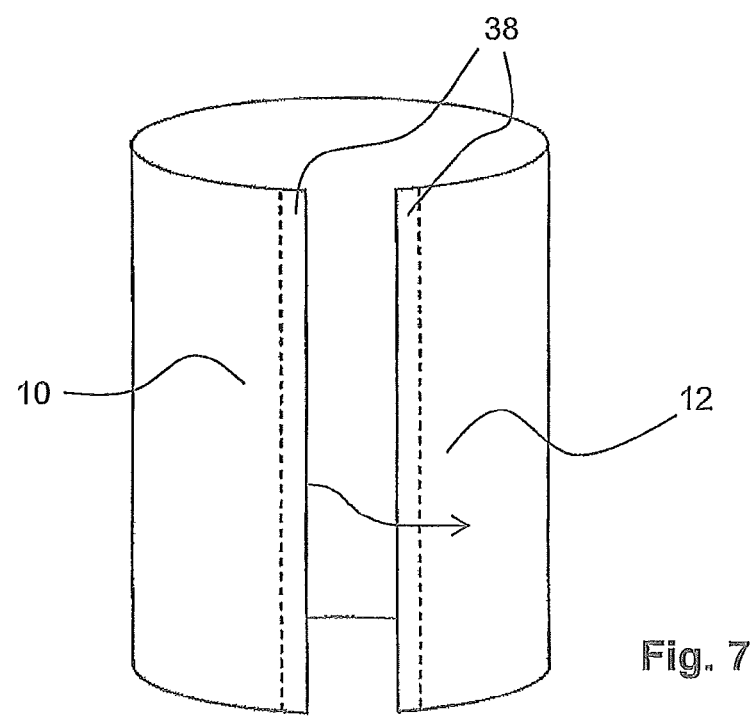

For example, in the embodiment a first and a second laminate 10, 12 have been described. However, it should be understood that the first and second laminate can be a first and second portion 10, 12 of the same laminate. For instance, a rectangular blank or a web is to be formed into a sleeve or a tube and sealed along two longitudinal edges in an overlapping joint area 38. The first laminate 10 will then constitute a portion of the blank along the first edge, whereas the second laminate 12 will constitute a portion of the blank along the second edge. FIG. 7 is showing a blank being formed into a tubular sleeve. The areas 38 will later create an overlap which will be sealed.

The sealing method can be used when sealing joints like the one shown, i.e. joints where the two laminates are abutting each other with their inside (or outside) surfaces facing each other. It can also be used for sealing overlapping joints where an outside surface of one of the laminates are abutting an inside surface of the other laminate forming an overlap.

In this description the sealing pressure and the magnetic field are applied by one and the same device, i.e. the pair of sealing jaw 14 and anvil 16. However, it should be understood that the pressure and the field could be applied by different devices, i.e. the field and pressure being applied separately.

In the described embodiment the sealing jaw 14 is an inductor comprising a conductor 24 connected to an alternating current supply 18. The described anvil 16 is electrically conducting and passive, i.e. is not connected to any power supply, but comprises a conductor 32 that is arranged to be able to induce a current in response to the current in the conductor 24 of the sealing jaw 14. However, it should be understood that the anvil 16 could be of the electrically conducting type, but instead be active. It will then be of the same type as the sealing jaw 14, i.e. connected to an alternating current supply. The sealing jaw 14 and the anvil 16 could be connected to the same control and power to supply system, or be connected to separate systems.

In another embodiment the anvil could be constituted as a conductor in the form of a copper plate. The copper plate could have direct contact with the packaging material laminate or be covered by for example a layer of protective rubber. The rubber will be provided at least in between the conductive copper plate and packaging material laminate, i.e. the action face of the anvil will be in rubber, and the packaging material will have indirect contact with the conductive plate.

Alternatively, the anvil 16 could be manufactured without any conducting capabilities, i.e. the anvil 16 would be an insulator and made of for example rubber. However, then it would of course not be able to enhance the magnetic field.

What is claimed is:

1. Method for sealing a first packaging material laminate to a second packaging laminate, at least the first laminate comprising at least one layer of magnetizable particles and a sealable layer, the method comprising:
providing an alternating magnetic field to the first and second packaging laminates in a sealing zone to generate magnetic hysteresis losses in the laminate comprising the magnetizable particles and create heat substantially melting the sealable layer in the sealing zone, wherein the magnetic field is provided by at least a sealing jaw, the sealing jaw including an inductor comprising a conductor connected to an alternating current supply which supplies current to the conductor, and wherein the magnetic field provided by the sealing jaw is enhanced by an electrically conducting anvil opposed to the sealing jaw, the anvil being passive and inducing a current in response to the current in the conductor of the sealing jaw, thereby generating a magnetic field enhancing the magnetic field generated by the sealing jaw, and
applying a sealing pressure to the first and second packaging laminates to press together the first and second packaging laminates in the sealing zone, thereby sealing the first and second packaging laminates to each other.

2. The method according to claim 1, comprising providing the alternating magnetic field in such a way that a main direction of the magnetic field lines is substantially parallel with a plane constituting the first packaging material laminate.

3. The method according to claim 1, comprising generating the alternating magnetic field of a strength substantially large enough to make the magnetizable particles substantially reach the magnetic saturation level.

4. The method according to claim 1, comprising alternating the magnetic field with a frequency in the interval 0.5-5 MHz.

5. The method according to claim 1, wherein the magnetizable particles comprise $Fe_3O_4$ particles.

6. The method according to claim 1, comprising applying said sealing pressure by said sealing jaw and said anvil.

7. The method according to claim 1, comprising alternating the magnetic field with a frequency in the interval 1-4 MHz.

8. Method for sealing together two packaging material laminates, the method comprising:
- positioning two packaging laminates between a sealing jaw and an anvil so that an exposed sealable layer on one packaging material laminate faces an exposed surface on an other packaging material laminate, the one packaging laminate also including magnetizable particles, the sealing jaw including an inductor comprising an electrical conductor embedded in an insulator, and the anvil comprising an electrical conductor embedded in an insulator;
- supplying alternating electrical current to the electrical conductor in the sealing jaw to generate a magnetic field which magnetizes the magnetizable particles in the one packaging laminate and produces hysteresis losses;
- inducing electrical current in the anvil by virtue of the inductor in the sealing jaw so the anvil generates a magnetic field which strengthens the magnetic field generated by the sealing jaw;
- melting the exposed sealable layer of the one packaging laminate using energy from the hysteresis losses; and
- pressing together the melted sealable layer of the one packaging laminate and the exposed surface on the other packaging material laminate to seal together the one packaging laminate and the other packaging material laminate in a sealing zone.

9. The method according to claim 8, wherein the generated magnetic field includes magnetic field lines substantially parallel to a plane of the one packaging material laminate.

10. The method according to claim 8, wherein the supplying of the alternating electrical current to the conductor in the sealing jaw comprises supplying the alternating electrical current to the conductor in the sealing jaw so that the magnetizable particles substantially reach a magnetic saturation level.

11. The method according to claim 8, wherein the supplying of the alternating electrical current to the conductor in the sealing jaw comprises supplying alternating electrical current having a frequency between 0.5-5.0 MHz.

* * * * *